(12) United States Patent
Yin

(10) Patent No.: US 8,553,580 B2
(45) Date of Patent: Oct. 8, 2013

(54) MULTI-RADIO MEDIUM-AGNOSTIC ACCESS ARCHITECTURE

(75) Inventor: Hujun Yin, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 192 days.

(21) Appl. No.: 13/250,888

(22) Filed: Sep. 30, 2011

(65) Prior Publication Data

US 2013/0083678 A1  Apr. 4, 2013

(51) Int. Cl.
*H04J 1/16* (2006.01)
*H04L 12/26* (2006.01)
*H04W 4/00* (2009.01)

(52) U.S. Cl.
USPC .......... 370/252; 370/328; 370/310; 455/436; 455/452.2

(58) Field of Classification Search
USPC ........ 370/252–329, 437, 444; 455/436–452.2
See application file for complete search history.

(56) References Cited

U.S. PATENT DOCUMENTS

| 2006/0056448 | A1 | 3/2006 | Zaki et al. |
| 2009/0180451 | A1* | 7/2009 | Alpert et al. ............. 370/338 |
| 2010/0099393 | A1 | 4/2010 | Brisebois et al. |
| 2011/0044218 | A1* | 2/2011 | Kaur et al. ............. 370/310 |
| 2011/0200008 | A1 | 8/2011 | Carlton |

FOREIGN PATENT DOCUMENTS

| WO | WO 2008110641 A1 * | 9/2008 |
| WO | 2013/048878 A2 | 4/2013 |

OTHER PUBLICATIONS

International Search Report and Written Opinion received for PCT Patent Application No. PCT/US2012/056354 mailed on Mar. 25, 2013, 10 pages.

* cited by examiner

*Primary Examiner* — Afsar M Qureshi
(74) *Attorney, Agent, or Firm* — Carrie A. Boone

(57) ABSTRACT

A multi-radio medium-agnostic access architecture is proposed. The multi-radio medium-agnostic architecture features a medium-agnostic MAC that interfaces between the TCP/IP and the physical layers of user equipment, such as a laptop computer or cellular phone having multiple radios, so that the radios in the user equipment may operate simultaneously, seamlessly, and transparently to higher layers.

16 Claims, 9 Drawing Sheets

MULTI-RADIO MEDIUM-AGNOSTIC ACCESS ARCHITECTURE

TECHNICAL FIELD

This application relates to multi-radio access, multi-radio co-existence, and radio resource management issues.

BACKGROUND

It is becoming increasingly clear that emerging mobile devices such as handsets, mobile internet devices (MIDs), palmtops, and laptops will support multiple wireless technologies to achieve high data rates and provide ubiquitous connectivity. These mobile devices will include WiFi, Bluetooth (BT), global positioning system (GPS), cellular second generation (2G), and third generation (3G) technologies, such as global systems mobile (GSM), universal mobile telecommunications system (UMTS), and emerging fourth generation (4G) technologies such as mobile WiMAX (worldwide interoperability for microwave access) and/or LTE (long-term evolution).

From a user perspective, multi-radio devices extend the flexibility to choose among available accesses and services according to different needs, such as quality of service (QoS), cost, and so on, as well as the freedom to access any network that is available.

From an operator perspective, deploying a mix of multiple access systems at various stages in time and subject to market and regulatory considerations may improve the availability, reliability, and capacity of the services offered to the end users.

Multiple access systems should interact seamlessly for the users to receive a variety of content via a choice of delivery mechanisms, depending upon the particular terminal capabilities, location, and user profile. Multiple radios also must work together on the same device. For a multi-radio device, the minimum requirement is the seamless handoff, i.e., users may seamlessly switch their service from one radio to the other without impacting their service. There are also scenarios in which multiple radios are expected to operate simultaneously to provide multi-media service.

Current radio access technologies have independent physical (PHY) layer and MAC layer (where MAC is short for media access control) operation and use client-based mobile Internet protocol (IP), which requires a complex protocol stack in the mobile device and on the network side. It is very challenging to support either seamless handoff or simultaneous multi-radio operation under the current situation for several reasons: 1) because of the close proximity of the radio frequencies, active radios may interfere with each other; 2) the radio frequency (RF) module is shared between two or more wireless technologies; 3) the physical interface to the platform is shared by two or more wireless technologies (e.g., there exists a power drain limitation).

Thus, there is a continuing need for an architecture that overcomes the shortcomings of the prior art.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a multi-radio medium-agnostic access architecture is disclosed. The multi-radio medium-agnostic architecture features a medium-agnostic MAC that interfaces between the TCP/IP and the physical layers of user equipment, such as a laptop computer or cellular phone having multiple radios, so that the radios in the user equipment may operate simultaneously, seamlessly, and transparently to higher layers.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. The following detailed description is, therefore, not to be construed in a limiting sense, as the scope of the subject matter is defined by the claims.

The background section introduces several issues associated with medium-agnostic access, multi-radio access, multi-radio co-existence, and radio resource management. Resolving these issues requires tight cross-MAC coordination for multiple radios co-located on the same device so as to: 1) avoid interference among radios operating on radio frequency in close proximity; 2) avoid conflict in shared hardware or other resources (e.g., RF, power, etc.); 3) activate a subset of radios based on availability, cost, and QoS; 4) appropriately distribute the service load among the active radios in a manner transparent to the user; and 5) make multi-radio operation transparent to upper layers.

Figure 1:
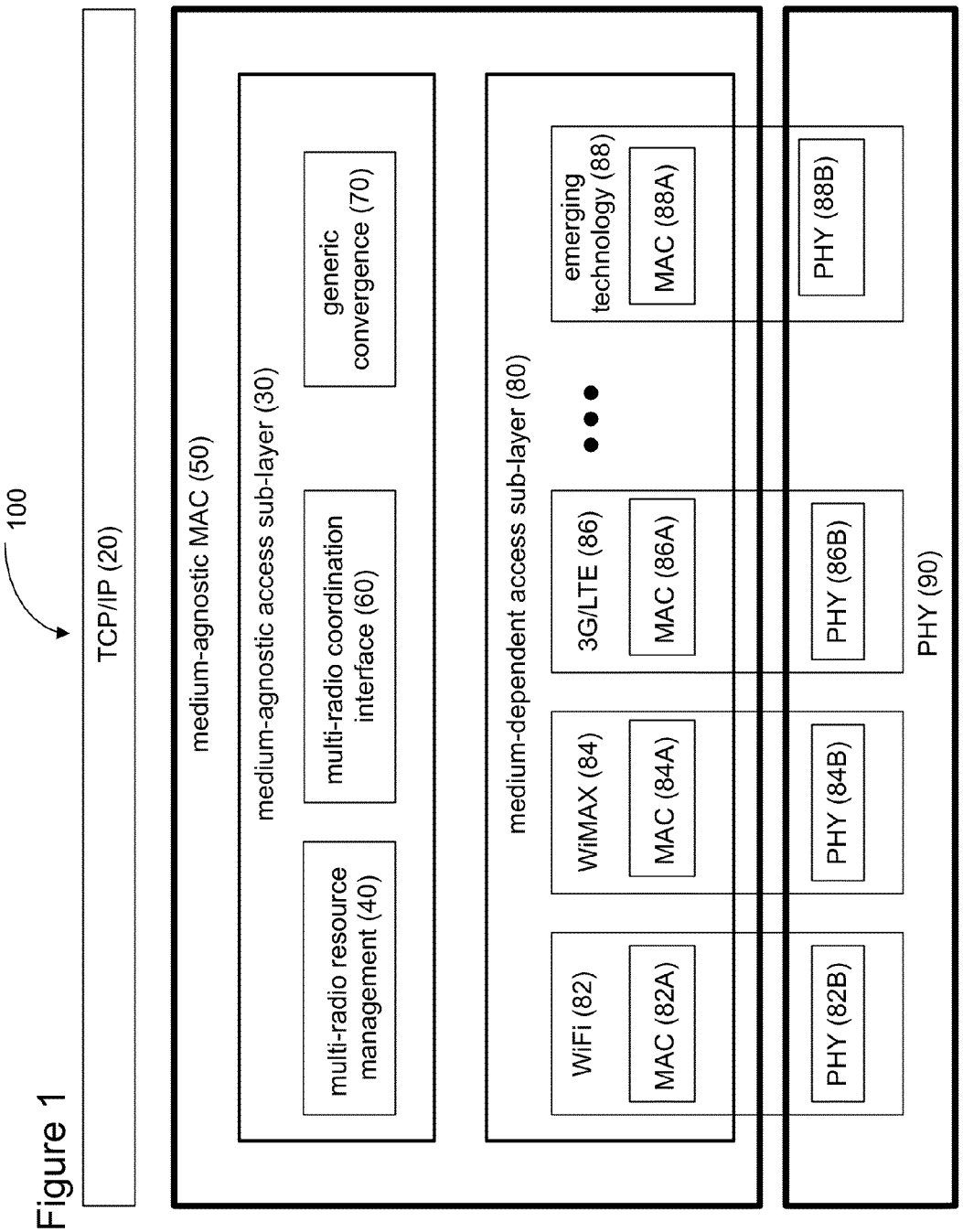
FIG. 1 is a block diagram of a multi-radio medium-agnostic architecture including a medium-agnostic MAC, according to some embodiments.

FIG. 1 is a schematic block diagram of a multi-radio medium-agnostic (MMA) architecture 100, according to some embodiments. The MMA architecture 100 includes a medium-agnostic MAC 50 disposed between a TCP/IP layer 20 and a physical (PHY) layer 90. The medium-agnostic MAC 50 includes a medium-agnostic access (MAA) sub-layer 30 and a medium-dependent access (MDA) sub-layer 80. The MAA sub-layer 30 includes a multi-radio resource management function 40, a multi-radio coordination interface function 60, and a generic convergence function 70. The MDA sub-layer 80 includes current radio access technologies, such as WiFi 82, WiMAX 84, 3G/LTE 86, and one or more as yet unknown emerging technologies 88.

In some embodiments, to achieve multi-radio-aware operation, the medium-agnostic MAC 50 is able to coordinate the operation of each individual radio. The MAA sub-layer 30 part of the medium-agnostic MAC 50 provides transparent services to higher layers (for example, the TCP/IP layer 20 or the application layer), independent of the underlying radio operation (in the MDA sub-layer 80). In some embodiments, the MAA sub-layer 30 provides:

- efficient usage of wireless medium and spectrum by preventing ill-guided air interface behavior, reducing frame loss, and enabling seamless interaction among radios
- improved user experience by supporting more multi-radio simultaneous usages and providing cheaper/smaller devices without sacrificing functionality and performance
- unified radio resource measurement/management provided across spectrum/radios The medium-agnostic MAC 50 is a multi-radio-aware MAC. In some embodiments, the medium-agnostic MAC 50 has the following properties:

- predictability: the activity (transmit, receive, turn off) of each radio follows a predictable pattern so that other radios may avoid conflict
- compressibility: each radio shall minimize the transmit/receive duration and the duty cycle to allow other radios to operate
- selectability: there exists a standard interface within each individual radio to coordinate its operation with peers according to other radio activities in a time-division multiplexing fashion Each radio in the MDA sub-layer 80 includes its own MAC layer. Thus, in FIG. 1, the WiFi radio 82 includes a WiFi MAC 82A, the WiMAX radio 84 includes a WiMAX MAC 84A, the 3G/LTE radio 86 includes a 3G/LTE MAC 86A, and any emerging technology radio 88 would have its own MAC 88A. The radio MACs 82A, 84A, 86A, 88A are each proprietary to the radio they support, that is, the MACs do not necessarily operate similarly. Since each radio has a different air interface, in order to support seamless multi-radio operation, the MAA sub-layer 30 operates as interface between the MACs 82A, 84A, 86A, 88A of the respective radios 82, 84, 86, 88 and one or more higher layers, such as the TCP/IP layer 20 or an application layer (not shown).

Figure 2:
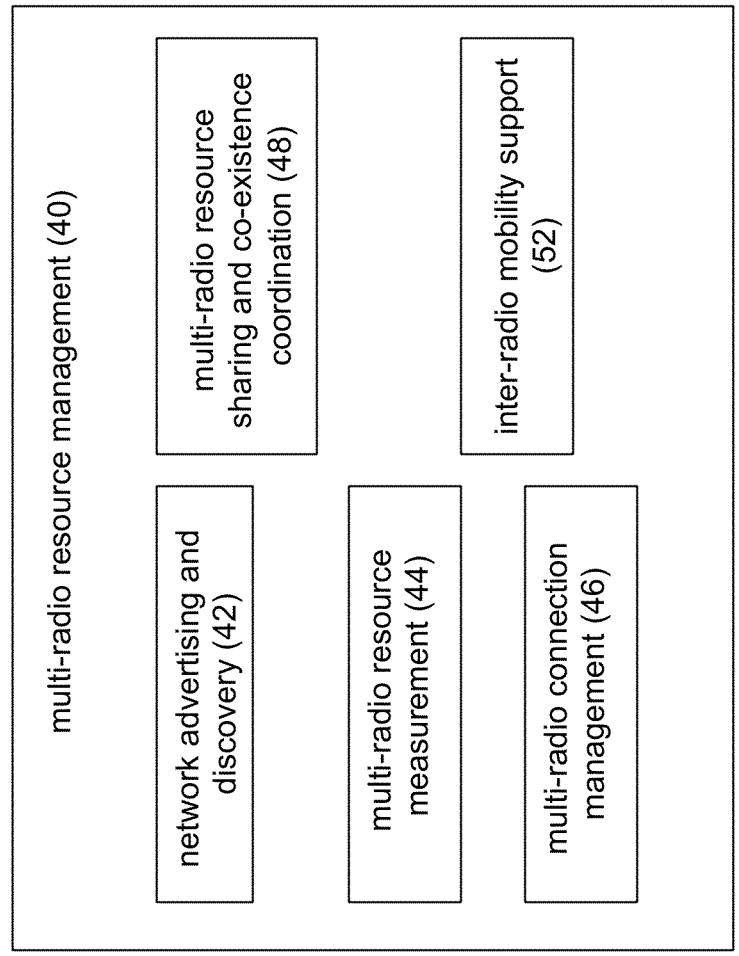
FIG. 2 is a block diagram showing the multi-radio resource management functions of the medium-agnostic MAC of FIG. 1, according to some embodiments.

FIG. 2 is a schematic block diagram of the extended multi-radio resource management (MRRM) function 40 of the medium-agnostic MAC 50, according to some embodiments. The MRRM function 40 is part of the MAA sub-layer 30 of the multi-radio medium-agnostic architecture 100 (FIG. 1). The MRRM function 40 supports the following functions: network advertising and discovery 42, multi-radio resource measurement 44, multi-radio connection management 46, multi-radio resource sharing and co-existence coordination 48, and inter-radio mobility support 52. Each of these functions is described in more detail below.

Network Advertising and Discovery 42.

The multi-radio network advertising and discovery function 42 supports inter-radio technology network advertisement and multi-radio scanning to facilitate multi-radio network discovery.

Resource Measurement 44.

The multi-radio resource measurement function 44 provides measurement and decision metrics over multiple radio channels. To the extent possible, the resource measurement function 44 facilitates a maximum reuse of existing measurements in each radio. Additional measurements may be defined for additional enhancements as needed by this function 44 to reliably predict the availability of service and level of quality of service (QoS) across multiple radios. Also, scanning/measurement procedures may be adjusted (such as period and duration) by this function 44 according to the multi-radio configuration.

In some embodiments, the decision metrics performed by the resource measurement function 44 include, but are not limited to, carrier to interference-plus-noise ratio (CINR), signal to interference-plus-noise ratio (SINR), received signal strength indication (RSSI), rise over thermal (RoT), load, network allocation vector (NAV), radio link failure, throughput, delay, etc.

The radios 82, 84, 86, 88 perform measurements on their designated operating channel. Measurements such as channel quality, signal strength, channel noise, and interference are routinely obtained by the radios. These measurements are periodically received and processed by the multi-radio resource management function 44 of the extended MRRM 40.

Multi-Radio Connection Management 46.

The connection management function 46 is a radio environment-aware radio activation, switching, and aggregation function. Based on the available radio resource measurements, this function 46 determines the best radio to activate, performs a fast switching operation between multiple radios, and aggregates multiple radios to provide desired connectivity and quality of service (QoS).

Multi-Radio Resource Sharing and Co-Existence Coordination 48.

The resource sharing function 48 determines the required active time pattern of each radio air interface for a given traffic load and application characteristics to avoid conflict among active radios.

Inter-Radio Mobility Support 52.

The mobility support function 52 provides measurement and coordination to facilitate a seamless handover across multiple radio technologies.

Returning to FIG. 1, the MAA sub-layer 30 of the multi-radio medium-agnostic architecture 100 also includes the multi-radio coordination interface function 60. In some embodiments, the multi-radio coordination interface 60 sets up an explicit co-existence-aware operation on each radio interface based on the required active time pattern for avoiding interference and resource conflict of multi-radio simultaneous operation.

The MAA sub-layer 30 of the multi-radio medium-agnostic architecture 100 also includes the generic convergence function 70, which provides a common data format in and out of each radio air interface to upper layer protocols to allow transparent operation of multiple radios to higher layers. In some embodiments, the data coming from higher layers is classified and distributed to multiple radio interfaces. In some embodiments, the data coming from multiple radio interfaces is converged to a common format before delivering to higher layers.

Figure 4:
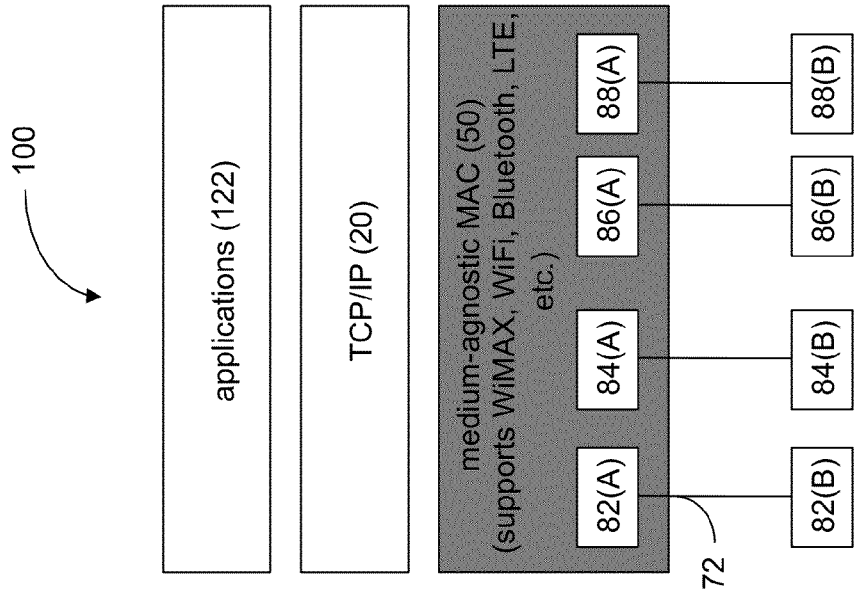
FIG. 4 is a block diagram of a protocol stack including the medium-agnostic MAC of FIG. 1, according to some embodiments.
Figure 3:
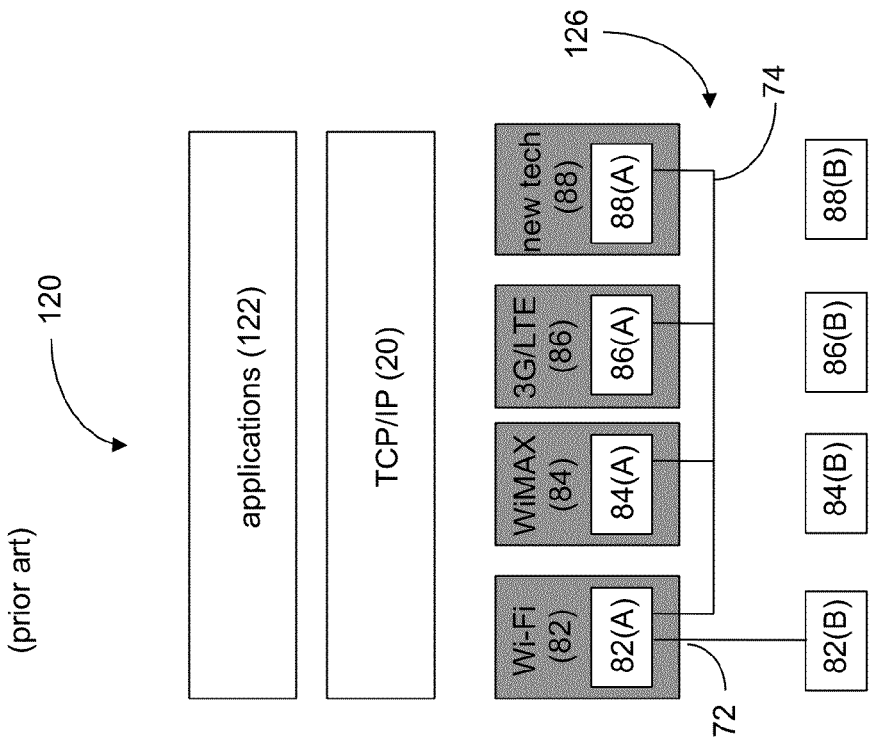
FIG. 3 is a block diagram of a protocol stack including several radio technologies, according to the prior art.

FIGS. 3 and 4 are schematic block diagrams used to contrast a prior art protocol stack 120 with the multi-radio medium-agnostic architecture 100 of FIG. 1, respectively. The prior art protocol stack 120 includes an applications layer 122, a TCP/IP layer 20, multiple radios 126, such as WiFi 82, WiMAX 84, 3G/LTE 86, and emerging technologies 88. The multiple radios have their own MAC (82A, 84A, 86A and 88A) and PHY (82B, 84B, 86B and 88B). The PHY and MAC of one radio operates independently of the PHY and MAC of another radio. In the medium-agnostic architecture 100, the medium-agnostic MAC layer 50 acts as an interface between the TCP/IP layer 20 and the multiple radios (82, 84, 86 and 88). The medium-agnostic MAC 50 thus bridges multiple radio air-interfaces and provides a universal interface to the higher layers (e.g., above the MAC) of the stack.

The radios in the prior art protocol stack 120 are media-dependent and discrete elements (four separate orange boxes) while the medium-agnostic MAC 50 is media-independent and unified (single blue box). The connection 72 between the WiFi MAC 82A and PHY 82B is the RF/BB control. An inter-radio interface 74 connects between the various MACs of the non-WiFi radios, as shown in FIG. 3. The inter-radio interface 74 serves as an external coordination function between the different MACs of the radios, which are more limited in functionality than the media-agnostic MAC 50.

Figure 5:
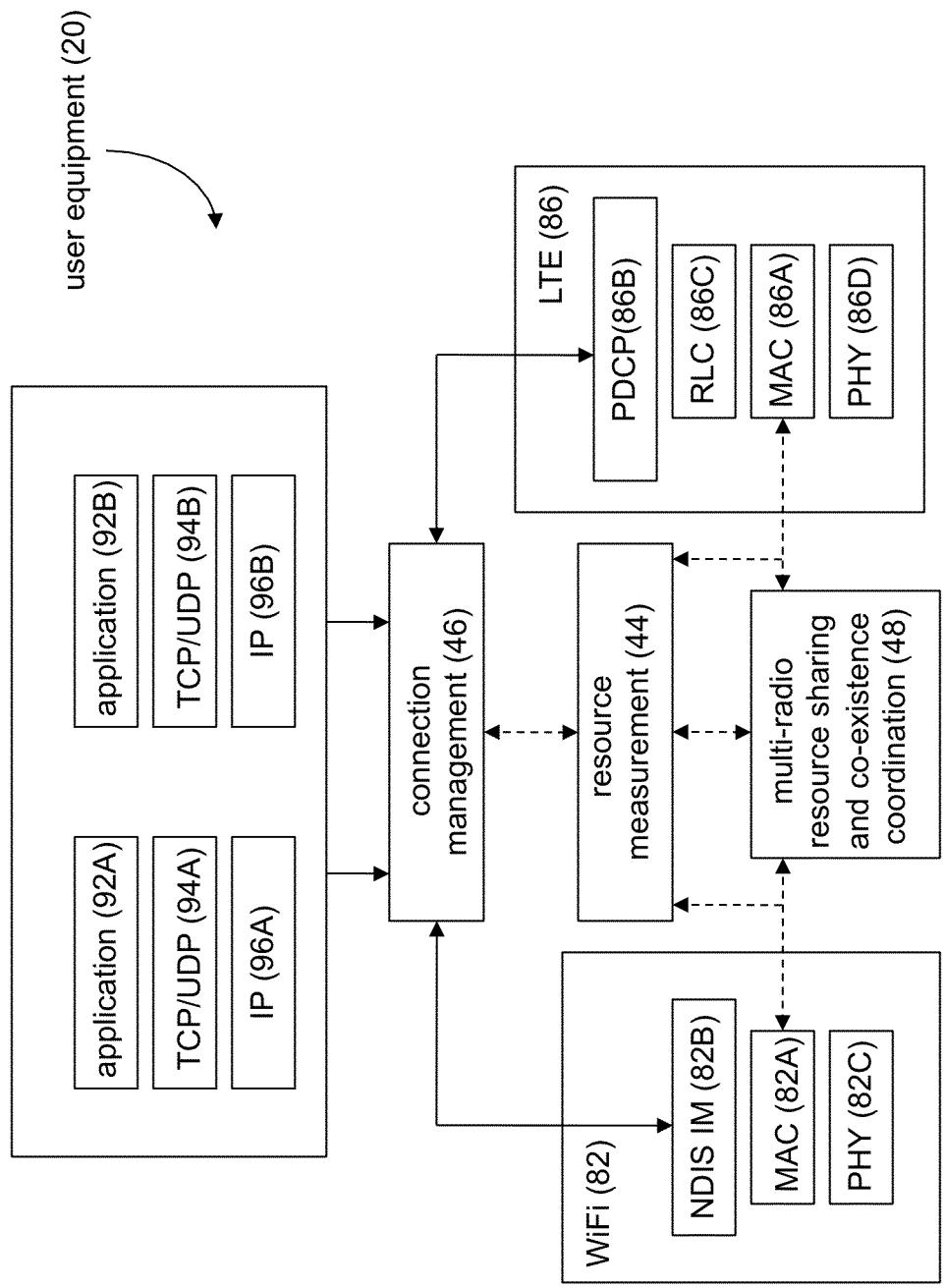
FIGS. 5 and 6 are block diagrams of operations performed by the medium-agnostic MAC of FIG. 1, according to some embodiments.

FIG. 5 is one example of a mobile device (user equipment) 20 having two radios, a WiFi radio 82 and a 3G/LTE radio 86, according to some embodiments. The diagrams show operations performed by the medium-agnostic MAC 50 in supporting multiple radios. There are upper layers of the protocol stack, including an application layer 92A, a TCP/UDP layer 94A, and an IP layer 96A (for the WiFi radio 82), as well as an application layer 92B, a TCP/UDP layer 94B, and an IP layer 96B (for the LTE radio 86).

As shown in FIG. 5, the two radios have different internal architectures. In addition to the MAC 82A introduced in FIG. 1, the WiFi radio 82 has a network driver interface specification/intermediate driver (NDIS IM 82B), disposed between the IP layer and the MAC layer 82A, and a physical layer (PHY 82C). The LTE radio 86 has a packet data convergence protocol (PDCP) layer 86B, a radio link control (RLC) layer 86C, the MAC layer 86A, and a physical layer 86D.

The resource measurement function 44 (FIG. 2) of the medium-agnostic MAC 50 collects and disseminates measurement and decision metrics over multiple radio channels. These measurements are obtained from the radios found in the user equipment 20. In some embodiments, the resource measurement function 44 obtains these metrics at an initial stage of operation of the user equipment 20, but the metrics may also be obtained periodically. The metrics obtained by the resource measurement function 44 are disseminated to other parts of the medium-agnostic MAC 50, including the resource sharing and co-existence coordination function 48, which coordinates the MAC operation of multiple radios to ensure that multiple radios operate interference free and hardware conflict free. The metrics obtained by the resource measurement function 44 are disseminated to the connection management function 46, which performs radio activation/switching/aggregation function. The connection management function 46 communicates with both radios to determine the best operation mode of multiple radios based on radio research measurements and application QoS requirements.

Figure 6:
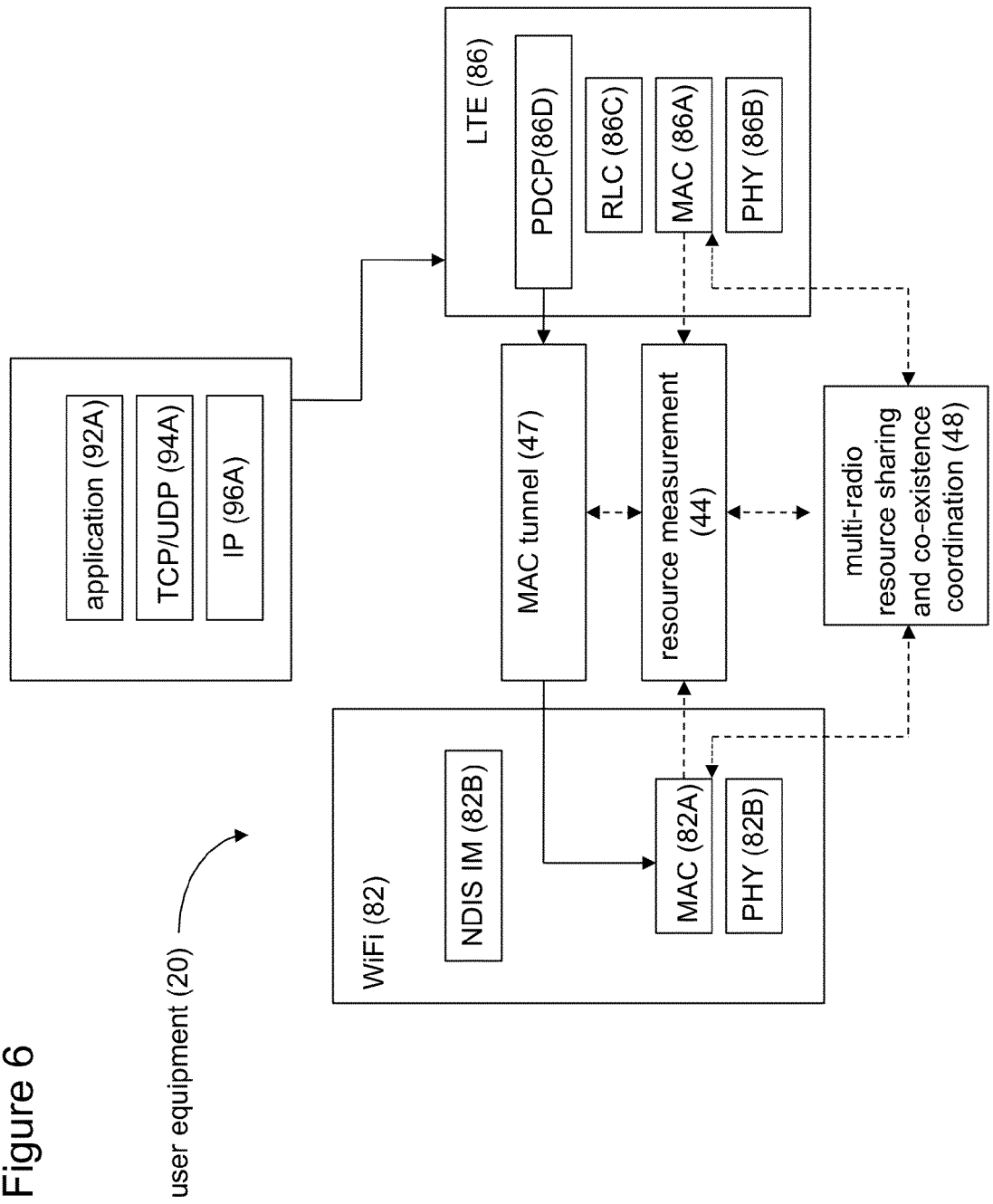

FIG. 6 shows another example of a mobile device (user equipment) 20 having two radios, a WiFi radio 82 and a 3G/LTE radio 86, according to some embodiments. In this example, both radios share the same upper stacks, including an application layer 92A, a TCP/UDP layer 94A, and an IP layer 96A. Because the upper stacks are not different in these two radios, there is no need for the connection management function 46 as in the previous example. Instead, in this example, the MAC tunnel 47 controls data into the LTE radio 86 from the WiFi radio 82, and vice-versa. The resource measurement function 44 of the medium-agnostic MAC 50 collects and disseminates measurement and decision metrics over multiple radio channels. These measurements are obtained from the radios found in the user equipment 20. In some embodiments, the resource measurement function 44 obtains these metrics at an initial stage of operation of the user equipment 20, but the metrics may also be obtained periodically. The metrics obtained by the resource measurement function 44 are disseminated to other parts of the medium-agnostic MAC 50, including the resource sharing and co-existence coordination function 48, which coordinates the MAC operation of multiple radios to ensure that multiple radios operate interference free and hardware conflict free.

The metrics obtained by the resource measurement function 44 are also disseminated to the MAC tunnel function 47, which determines whether to tunnel packets from the LTE PDCP layer (86D) to the WiFi MAC layer (82A). As part of the generic convergence function 70 (FIG. 1), the MAC tunnel function 47 communicates with both radios to determine the best operation mode of multiple radios based on radio research measurements and application quality of service requirements. With tunneling, the WiFi and LTE data streams are converged at the end of the tunnel on the LTE side.

Figure 7:
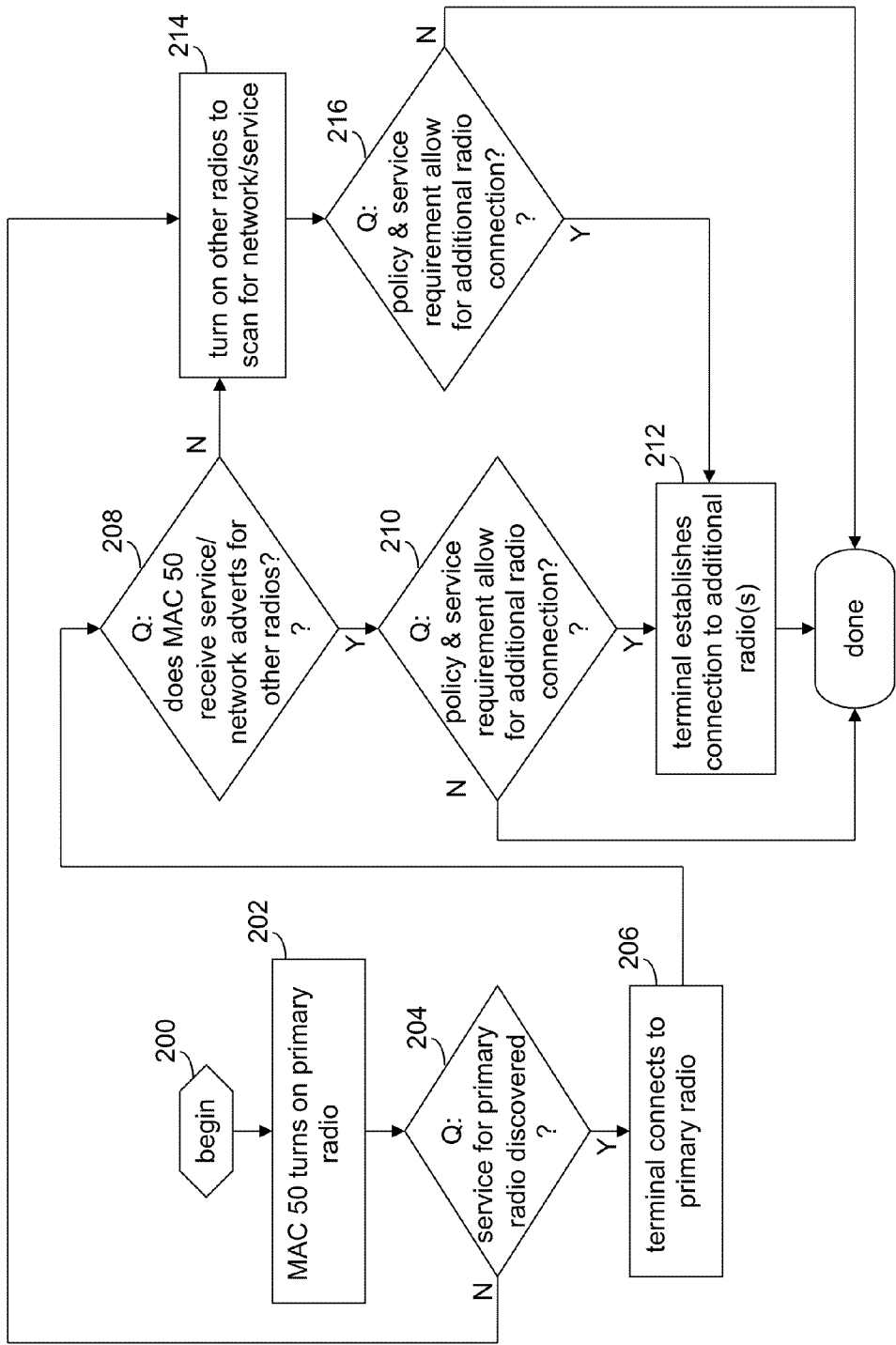
FIGS. 7, 8, and 9 are flow diagrams depicting the operations performed by the medium-agnostic MAC of FIG. 1, according to some embodiments.
Figure 8:
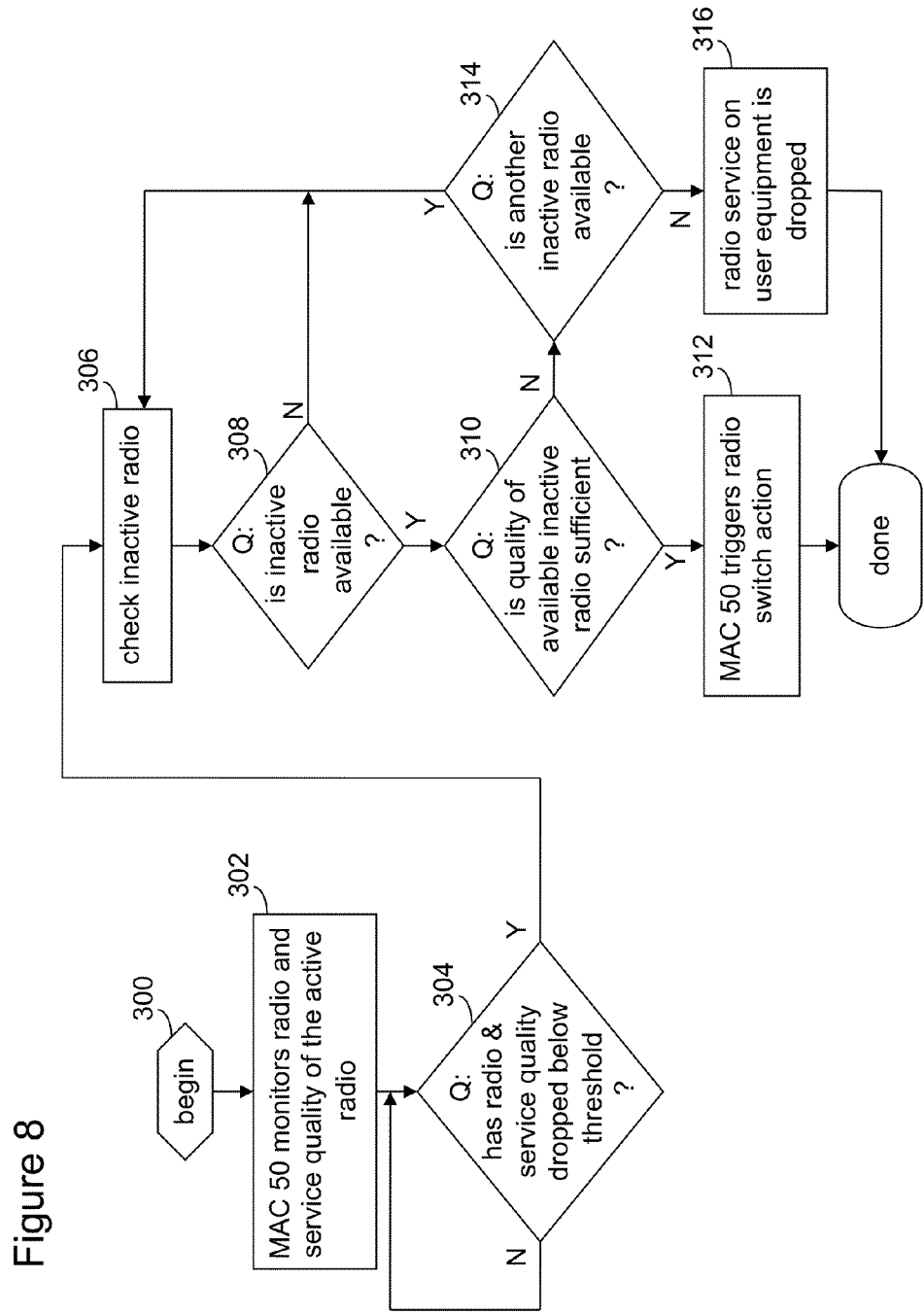
Figure 9:
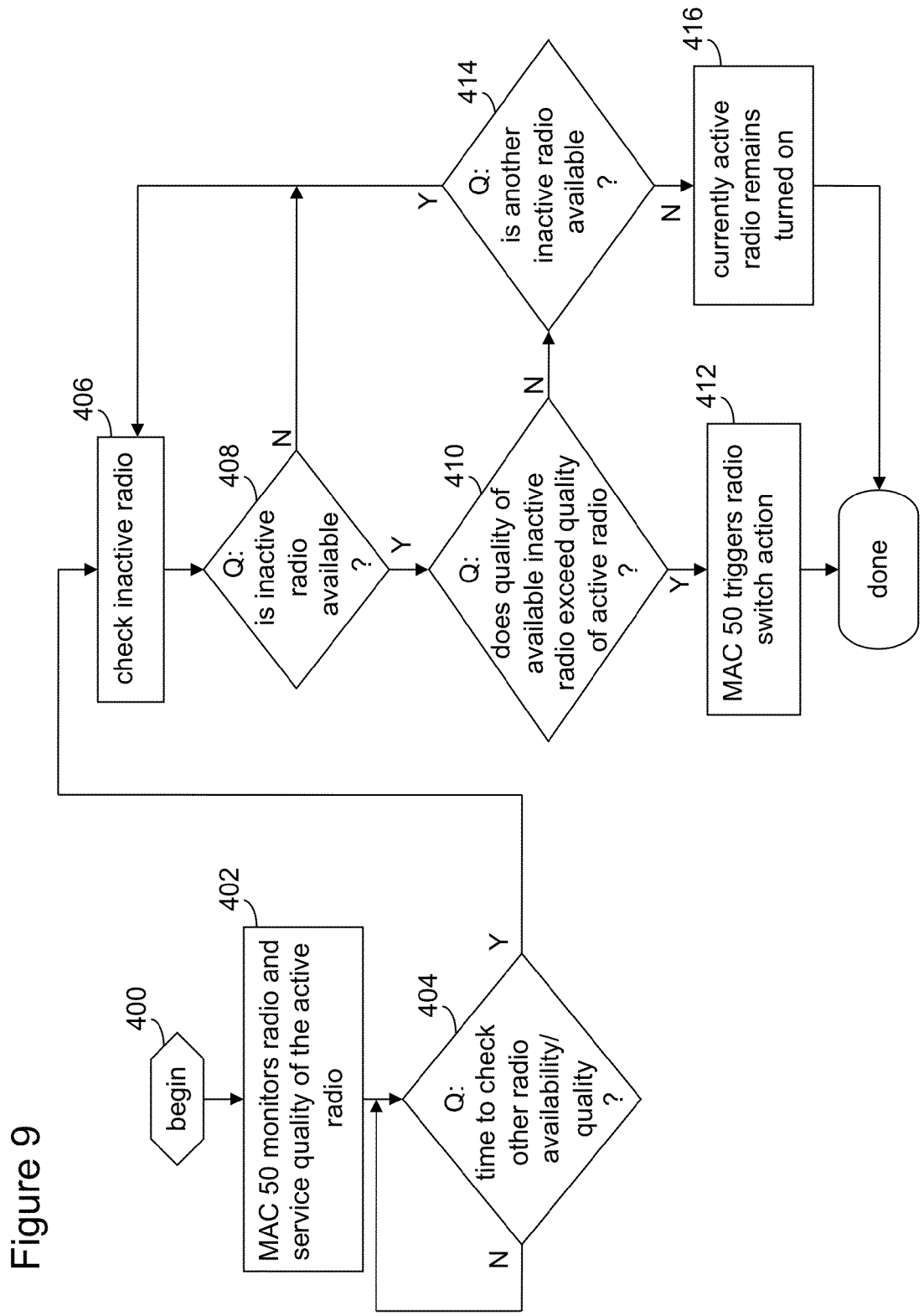

FIGS. 7, 8, and 9 are flow diagrams showing operations of the medium-agnostic MAC 50 in supporting multiple radios in the user equipment 20, according to some embodiments. FIG. 7 describes operations performed in initializing the user equipment 20, FIG. 8 describes the radio switching operations of the user equipment 20 brought on by quality issues, and FIG. 9 describes radio switching operations that periodically occur.

In FIG. 7, during initialization, the medium-agnostic MAC 50 turns on its primary radio (block 202). In some embodiments, the primary, or default, radio is a wide-range cellular radio, such as the 2G/3G/LTE radio 86. If service is discovered for this radio (block 204), then the device will connect to the service (block 206) provided by the primary radio.

In some embodiments, once connection to the primary radio is established, the medium-agnostic MAC 50 optionally receives service/network advertisements for other radios (block 208). Based on the information received and the policy and service requirements of the user equipment 20 (block 210), the device may choose to establish a connection to the additional radio(s) (block 212). In some embodiments, if service/network advertisement is not received for the other radios, the terminal may turn on these radios to scan for network/service (block 214) and may establish a connection to the additional radio(s) (block 212) based on its service and policy needs (block 216).

The flow diagram of FIG. 8 illustrates how radio switching operations are performed, according to some embodiments. Radio switching may be triggered in a few scenarios. First, an existing connection may not be able to be maintained, due to quality of service issues, user equipment mobility, channel fading, interference, or network congestion. Second, other radios may provide better quality of service or a lower cost (e.g., from cellular to WiFi). In both scenarios, the radio and service quality are monitored on the active radio.

FIG. 8 shows the operations performed by the MAC 50 to switch between radios under the first scenario, in which the existing connection is unable to be maintained. First, the MAC 50 monitors the radio and service quality of the active radio(s) (block 302). If the radio or service quality drops below a certain threshold (block 304), a radio switch action is triggered. A first inactive radio is checked (block 306), first for availability (block 308), then for quality (block 310). Where both availability and quality are present, the MAC 50 will switch the new radio on (block 312). Where either the availability or the quality of the radio is not adequate, the MAC 50 checks whether another inactive radio may be available (block 314). If so, the process repeats for the new inactive radio. If no available radio meets the quality standards, then the radio service on the user equipment is dropped (block 316).

FIG. 9 shows the operations performed by the MAC 50 to switch between radios under the second scenario, in which the optimum radio(s) for the user equipment 20 is periodically reviewed. The operations commence with the MAC 50 monitoring the radio and service quality of the active radio (block 402). If the time period for checking other radios has occurred (block 404), the MAC 50 checks a first inactive radio (block 406), determining if the inactive radio is available (block 408), then determines whether its quality exceeds the active radio by certain threshold (block 410). If so, the MAC 50 switches to the alternative radio (block 412). These operations are performed for each available inactive radio (block 414). If the threshold is not exceeded, then the operation of the currently active radio is maintained (block 416).

In some scenarios, multiple radios on the user equipment are simultaneously active, such that the radios may compete for system resource, such as power, memory, or antenna. Or, the radios may interfere with each other, such as when they are operating on adjacent bands. The multi-radio coordination interface function (60) will coordinate the operation of multiple radios to avoid resource conflict and mutual interference.

The multi-radio resource measurement function 44 provides measurement over multiple radio channels. To the extent possible, the resource measurement function 44 facilitates a maximum reuse of existing measurements in each radio. Additional measurements may be defined for additional enhancements as needed by this function 44. Also, scanning/measurement procedures may be adjusted (such as period and duration) by this function 44 according to the multi-radio configuration.

The physical layer (PHY) uses radio waves to transmit and received packets composed at the upper layers. The PHY layer includes the RF transceiver, which contains high-frequency and analog devices, whereas the rest of the system is implemented with digital circuitry and embedded software, in some embodiments. The baseband part is the interface between the RF chip and the rest of the system.

Prior art technologies are wireless technology-specific and required different solutions on both the network side and on the client side, depending on the use of the wireless technology. Although proprietary solutions exist, they are highly radio dependent and not scalable to other radio architectures. The proposed multi-radio medium-agnostic architecture 100, by contrast, provides a common framework to address the operation of various combinations of radios in a scalable manner.

The idea proposes a generic form of the solution framework that would allow seamless multi-radio operation with a single architecture in the device or on the network side. The proposed solution:

Provides a more efficient usage of the wireless media and spectrum by avoiding ill-guided air interface behavior, reducing frame loss, and enabling seamless interaction among radios Improves the user experience by supporting multi-radio simultaneous operation usages and providing cheaper/smaller devices without sacrificing functionality and performance Simplifies the interface to higher layers so that it is easier for high-layer (e.g., application) developers to take full advantage of the potential of multi-radio system without dealing with the specific interface of each radio.

Figure 10:
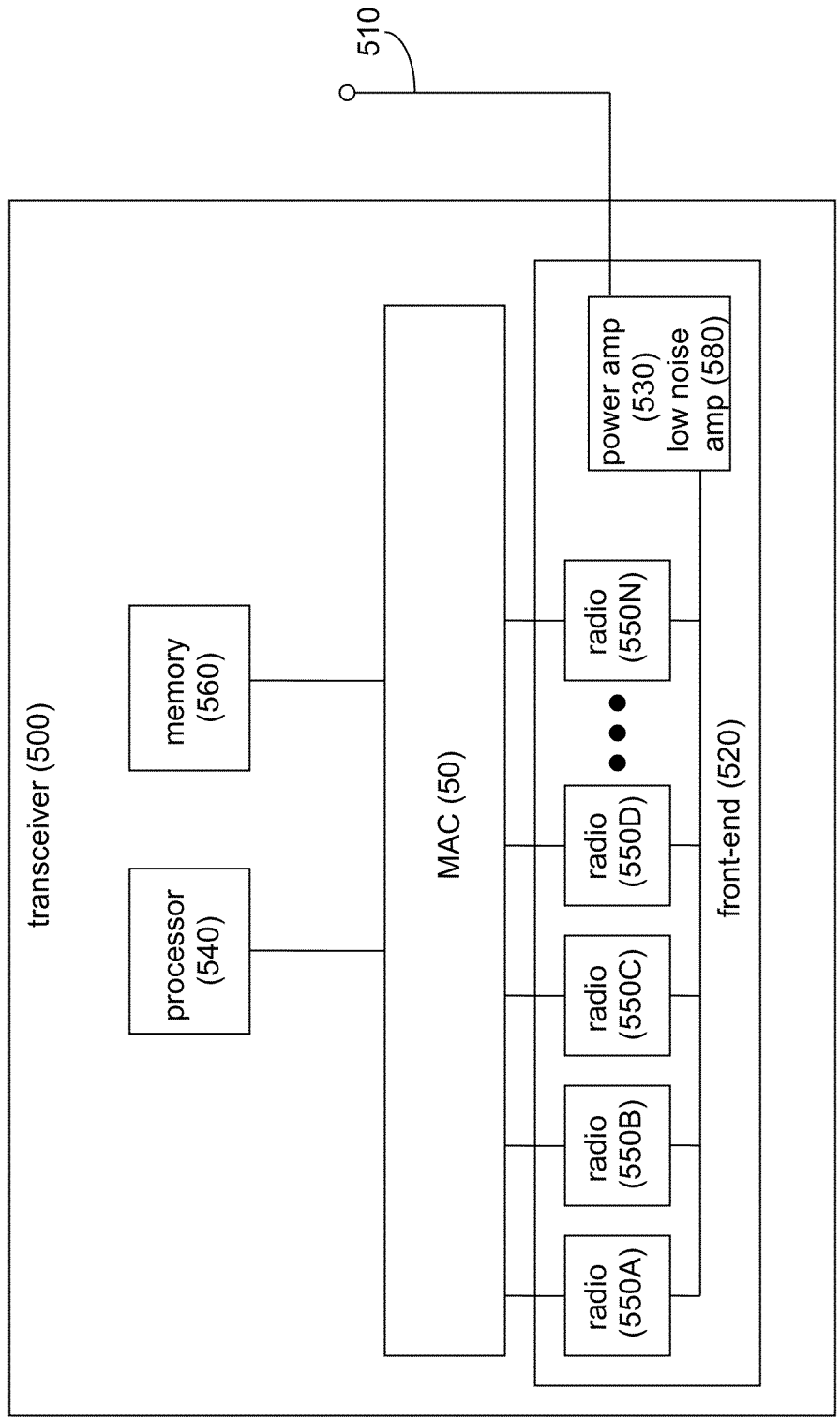
FIG. 10 is a block diagram of a transceiver employing the medium-agnostic MAC of FIG. 1, according to some embodiments.

FIG. 10 is a block diagram of a transceiver 500 employing the medium-agnostic MAC 50 of FIG. 1 in order to seamlessly support multi-radio operation, according to some embodiments. The transceiver 500 includes a processor 540 and a memory 560 for processing data packets transmitted to or received by the transceiver 500. One or more antennas 510 are used to transmit data packets to a remote receiver or to receive data packets sent by a remote transmitter.

The depiction of FIG. 10 is a simplified representation of the transceiver 500 and the MAC 50, and other devices, circuits, and logic elements that may be part either are omitted. The MAC 50 interfaces with logic devices that are commonly found in transmitters and receivers: the front-end 520, a digital-to-analog converter/analog-to-digital converter (not shown), one or more radios 550A, . . . , 550N (collectively, radios 550), and a base-band digital signal processor (not shown). The logic devices within the MAC 50 may consist of hardware, software, or a combination of hardware and software components.

The target modules 50 are commonly found in most transmitters and receivers. The front-end 520 is connected to the antenna 510, and may include a power amplifier 530 (for the transmitter), a low noise amplifier 580 (for the receiver), and an antenna switch (not shown), for switching between transmitter and receiver modes. The individual circuits may be connected together by way of a bus (not shown).

While the application has been described with respect to a limited number of embodiments, those skilled in the art will appreciate numerous modifications and variations therefrom. It is intended that the appended claims cover all such modifications and variations as fall within the true spirit and scope of the invention.

I claim:

1. A medium-agnostic media access control (MAC) embedded within a multiple-radio device, the medium-agnostic MAC comprising:
    a medium-dependent access sub-layer coupled to a plurality of radios in the multiple-radio device, each of the plurality of radios comprising a dedicated MAC that governs the access of its specific physical medium; and
    a medium-agnostic access sub-layer comprising:
        a multi-radio resource management function comprising:
            a multi-radio resource measurement function to collect decision metrics based on radio resource measurements taken by the plurality of radios; and
            multi-radio connection management function to perform activation of one of the plurality of radios, switching between two of the plurality of radios, and/or aggregates two or more of the plurality of radios, based on the metrics collected by the radio resource measurement function;
    wherein the medium-agnostic MAC provides transparent services to upper layers of a protocol stack, independent of underlying radio operation of the plurality of radios.

2. The medium-agnostic MAC of claim 1, wherein the decision metrics performed by the multi-radio resource comprise:
    service availability;
    quality of service (QoS);
    hardware resource conflict;
    interference; and
    a user-specific profile;
wherein the decision metrics are based on measurements obtained from each of the plurality of radios in the multiple-radio device.

3. The medium-agnostic MAC of claim 2, wherein the measurements obtained from each of the plurality of radios in the multiple-radio device comprise:
    carrier to interference-plus-noise ratio;
    signal to interference-plus-noise ratio;

received signal strength indication;
rise over thermal;
network load;
radio link failure;
packet error rate;
block error rate;
data throughput;
data latency; and
network allocation vector.

4. The medium-agnostic MAC of claim 1, the medium-agnostic access sub-layer further comprising:
a network advertising and discovery function to support inter-radio technology network advertisement and multi-radio scanning to facilitate multi-radio network discovery;
wherein the service availability of each radio of the plurality of radios is advertised over its respective radio air interface and/or other active radio air interfaces.

5. The medium-agnostic MAC of claim 4, wherein the service availability through multiple radios is obtained by connecting to one of the plurality of radios.

6. The medium-agnostic MAC of claim 4, wherein, each radio of the plurality of radios is turned on to scan the corresponding radio air interface to determine whether service is available for this radio.

7. The medium-agnostic MAC of claim 1, the multi-radio resource management function further comprising:
a multi-radio resource sharing and co-existence coordination function to determine, for each radio of the plurality of radios:
a required active time pattern of each radio air interface for a given traffic load; and
operation characteristics to avoid conflict among active radios of the plurality of radios.

8. The medium-agnostic MAC of claim 1, the multi-radio resource management function further comprising:
an inter-radio mobility support function to provide measurement and coordination during handover from one radio to another radio of the plurality of radios, the inter-radio mobility support includes but not limit to discovering available service, measuring the quality of existing service, predicting the quality of new service, exchanging the context for inter-radio handover.

9. The medium-agnostic MAC of claim 1, further comprising:
a multi-radio coordination interface function to set up an explicit co-existence aware operation on each radio of the plurality of radios, wherein the operation is based on a required active time pattern for avoiding interference and resource conflict of multi-radio simultaneous operation.

10. The medium-agnostic MAC of claim 1, the medium-agnostic access sub-layer further comprising:
a generic convergence function to provide, for each radio of the plurality of radios, a common data format in and out of each radio air interface to protocols of the upper layers;
wherein the generic convergence function enables transparent operation of multiple radios to the upper layers.

11. The medium-agnostic MAC of claim 10, the generic convergence function further comprising:
a MAC classification function to classify and distribute data packets from upper layers to each active radio of the plurality of radios; and
a MAC aggregation and convergence function to:
aggregate data packets from each radio of the plurality of radios; and
convert the aggregated data packets to a predetermined format to deliver to the upper layers.

12. The medium-agnostic MAC of claim 10, wherein the generic convergence function uses one radio of the plurality of radios in calculating the common data format, the medium-agnostic MAC further comprising:
a MAC tunnel function to communicate between two radios of the plurality of radios;
wherein the MAC tunnel function is used when a single upper layer stack is associated with one radio of the plurality of radios.

13. User equipment comprising:
a first radio comprising a media access control (MAC) and a physical (PHY) layer;
a second radio comprising a second MAC and a second PHY layer; and
a medium-agnostic MAC coupled between the MAC and the second MAC, the medium-agnostic MAC comprising:
a resource measurement function to perform decision metrics based on radio resource measurements taken by the first radio and the second radio; and
a multi-radio resource sharing and co-existence coordination function to determine, for the first and second radios:
a required active time pattern of each radio air interface for a given traffic load; and
operation characteristics to avoid conflict among an active radio of the first and second radios.

14. The user equipment of claim 13, wherein the first radio has a different upper stack than the second radio, the user equipment further comprising:
a connection management function to communicate with the first and second radios to determine, along with the radio resource measurements and applicable quality of service requirements, the best operation mode of the first and second radios.

15. The user equipment of claim 13, wherein the first radio and the second radio have the same upper stacks, the user equipment further comprising:
a MAC tunnel function to tunnel data from the first radio to the second radio and vice versa;
wherein the operations of the first and second radios are concealed from upper layers of a protocol stack.

16. The user equipment of claim 13 wherein a best operation mode of the first and second radios is obtained by:
classification of data packets from upper layers of a protocol stack; and
distribution of the classified data packets to the first and second radios based on quality of service requirements of each connection.

* * * * *